United States Patent [19]

Thudt et al.

[11] Patent Number: 4,554,874
[45] Date of Patent: Nov. 26, 1985

[54] ROLLER GUIDE DEVICE FOR USE ON A VEHICLE

[75] Inventors: Hubert Thudt, Puchheim, Fed. Rep. of Germany; Harald Winkler, Graz, Austria

[73] Assignee: M.A.N. Maschinenfabrik Augsburg-Nurnberg Aktiengesellschaft, Munich, Fed. Rep. of Germany

[21] Appl. No.: 451,801

[22] Filed: Dec. 21, 1982

[30] Foreign Application Priority Data

Dec. 24, 1981 [DE] Fed. Rep. of Germany ....... 3151410

[51] Int. Cl.$^4$ ............................ B62D 1/26; B61F 9/00
[52] U.S. Cl. ........................................ 104/247; 74/98; 180/131
[58] Field of Search .......................... 74/98, 385, 386; 104/242, 245, 247; 180/131; 414/776

[56] References Cited

U.S. PATENT DOCUMENTS

| 3,149,712 | 9/1964 | Soman ............................ 414/776 X |
| 3,234,891 | 2/1966 | Hampton et al. ................ 104/247 X |
| 3,712,238 | 1/1973 | Colovas et al. ..................... 104/130 |

FOREIGN PATENT DOCUMENTS

| 2636656 | 2/1978 | Fed. Rep. of Germany . |
| 2268676 | 11/1975 | France . |
| 2271093 | 12/1975 | France . |
| 2281866 | 3/1976 | France . |
| 43213 | 4/1977 | Japan ................................. 104/247 |

1336737 11/1973 United Kingdom .

Primary Examiner—Randolph A. Reese
Assistant Examiner—David F. Hubbuch
Attorney, Agent, or Firm—Scully, Scott, Murphy & Presser

[57] ABSTRACT

A roller guide device enabling a vehicle to be steered automatically consists of a roller retaining mechanism having a retaining lever connected to a steering linkage of a vehicle, and a pivoting lever which is pivotally connected to the forward end of the retaining lever. Arranged at the free end of the pivoting lever is a freely rotatable contact roller which can be pivoted from a retracted position in which the pivoting lever essentially coincides with the retaining lever in the direction of the pivoting shaft, into an operatively extended essentially straight-line position. The pivoting lever additionally rotates as a function of its pivoting motion about its longitudinal axis through about 90°, so that retraction and extension of the contact roller by pivoting through 180° is achieved by a primary drive, with the contact roller concurrently rotating through 90° through a secondary drive. In its extended position, the contact roller is brought into contact with and urged against a stationary guide track so as to roll therealong. This allows for mechanical, fully automatic track control of the vehicle when the contact roller is extended. In the nonautomatic steering mode, the retracted contact roller is arranged within the contour of the vehicle body to obviate road hazards when a roller guide device on a vehicle projects laterally therefrom.

8 Claims, 4 Drawing Figures

ROLLER GUIDE DEVICE FOR USE ON A VEHICLE

BACKGROUND OF THE INVENTION

1. Field of the Invention

The present invention relates to a roller guide device for use on a vehicle.

Roller guide devices of the most varied designs are currently known for use on undercarriages. These devices serve to guide the steerable undercarriage along a predetermined roadway or guide rail, in essence, a guide track, wherein at least one guide roller engages with the guide track.

2. Discussion of the Prior Art

More recent developments, as exemplified by German Laid-open Patent Application 26 36 656, are directed towards at least a partially automatic track guidance for road vehicles through the intermediary of at least one lateral rail, such as automatic track guidance for buses in an elevated stop area, wherein the bus operator turns over the steering controls to an automatic device over a certain distance of the route. A basic problem encountered by roller guide devices arranged laterally on the vehicle is that they must clearly project beyond the transverse vehicle contour to be able to engage with the guide track without damaging the side panel of the vehicle.

SUMMARY OF THE INVENTION

Accordingly, the present invention provides for a roller guide device of that type which facilitates the automatic, mechanical track guidance of a road vehicle or of some other steerable vehicle, but which is simple and compact in construction and reliable during operation, and wherein the vehicle is of a standard width when not operating in the automatic track guidance mode.

It is a more specific object of the present invention to provide an arrangement in which a contact roller is selectively brought into contact with a stationary guide track and is urged against the track so as to remain in rolling contact, wherein the roller retaining mechanism essentially consists of a retaining lever which is connected to the steering linkage end of a pivoting lever and is pivotally connected to the forward end of the retaining lever, with the pivoting lever carrying the freely rotatable contact roller at its free end being able to pivot from a retracted position in which it essentially coincides with the retaining lever in the direction of the pivoting shaft, into an extended essentially straight out position.

In a preferred embodiment of the present invention, the pivoting lever is rotatable about its longitudinal centerline, preferably through an angle of 90°, and as a function of its pivoting motion.

In a further advantageous aspect of the present invention, the pivoting shaft of the pivoting lever is driven by means of a primary drive, such as a geared DC motor which is mounted on the retaining lever. The geared DC motor which is advantageously mounted on the retaining lever, is connected to the pivoting shaft through a chain drive for rotation of the pivoting shaft.

Preferably, the pivoting shaft is fitted with a torque lock to latch the pivoting lever in the retracted and the extreme extended positions, and is readily unlatched by actuating the geared DC motor.

In order, in a simple manner, to effectuate rotation of the pivoting lever about its longitudinal centerline as a function of the pivoting motion of this lever, a secondary drive is integrated into the pivoting lever in the configuration of a bevel gear unit. The bevel gear unit advantageously consists of a bevel gear which is fixedly connected to the retaining lever so as to mesh with a second bevel gear arranged in line with the longitudinal centerline of the pivoting lever and which is attached to the lever. This eliminates the need for a separate motor to effectuate rotation of the pivoting lever.

In another preferred aspect of the present invention, a rotational stop is provided on the longitudinal centerline of the pivoting lever whereby, after angular adjustment, the pivoting lever can be locked by means of arresting means located between the stop and the bevel gear unit.

The retaining lever is attached to the vehicle steering linkage so as to allow for longitudinal adjustment and if necessary, for guide track adjustment.

For vertical adjustment off the contact roller, the roller allows for adjustment along its axis of rotation, especially through the use of a hollow clamping screw.

In summation, the invention provides for a simple, operationally reliable mechanical roller guide device for an automatic vehicle steering system which, when inoperative (vehicle in the stationary or nonautomatic steering mode), can rapidly be conducted from its extended operating position into a compact inoperative position. In a preferred embodiment of the present invention, changeover from the one steering mode to the other is achieved through a single geared DC motor accommodated, in a compact arrangement, on or within the retaining lever of the roller guide device.

In the nonautomatic steering mode, the total width of the vehicle is dependent upon the undercarriage of the vehicle body, wherein no interfering lateral extensions are then present on the vehicle so as to present any traffic hazards. This ideally produces a mechanically-operated dualmode vehicle steering system with the aid of simple devices.

BRIEF DESCRIPTION OF THE DRAWINGS

The present invention is now described more fully herein below in conjunction with the accompanying drawings illustrating an embodiment of the roller device; in which.

DETAILED DESCRIPTION

Figure 1:
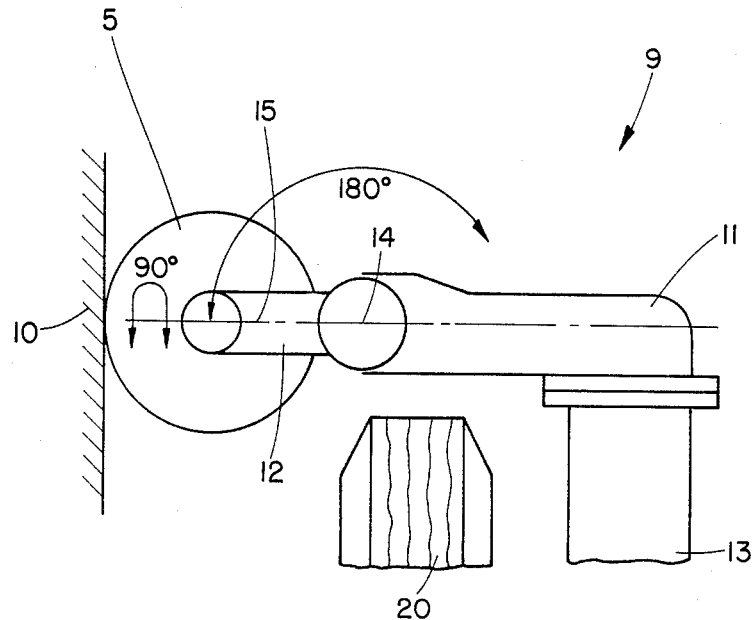
FIG. 1 is a schematic representation of an extended roller guide device of the present invention on the left-hand front wheel of a road vehicle, wherein the roller guide device engages with a left-hand guide track, shown in an automatic steering mode.

Referring now to FIG. 1, a roller guide device is constituted of a roller retaining mechanism 9 basically consisting of a retaining lever 11 and a pivoting lever 12 which is pivotally connected to a forward end of the retaining lever. The retaining lever 11 has a flanged portion 7 secured to the steering linkage 13 of a vehicle by means of bolts or the like. The linkage 13 provides a mechanical steering connection with the left-hand front wheel 20 of the vehicle.

Carried on the free end of the pivoting lever 12 is a freely rotatable contact roller 5, which is in rolling engagement with a stationary (left-hand) guide track 10 (see FIG. 1). In the automatic steering mode of the vehicle, and when the guide track is on the left-hand side of the vehicle, the contact roller 5 is urged into continuous rolling engagement with the guide track 10, so that the left-hand front wheel 20 has a tendency to steer towards the left-hand side.

Figure 2:
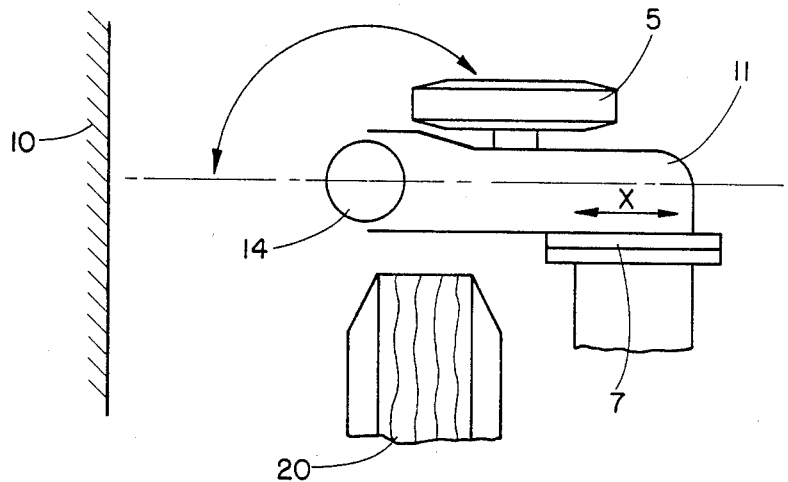
FIG. 2 illustrates the roller guide device of FIG. 1 in the retracted condition, in effect, the nonautomatic steering mode.

In the nonautomatic steering mode of the vehicle, the roller guide device retracts into the position shown in FIG. 2. The pivoting lever 12 which, in accordance with FIG. 1, extends along the generated centerline of the retaining arm 11, has been pivoted in FIG. 2 through 180° about the pivoting shaft 14 into the U-shaped retaining lever 11. During its 180° pivoting movement, the pivoting lever 12 rotates through 90° about its longitudinal centerline in a manner whereby the contact roller 5 stops in the immediate proximity to the retaining lever 11 in a position essentially parallel to the flanged portion 7 of FIG. 2. In this position, the retaining lever 11, the pivoting lever 12 and the contact roller 5 are retracted in a very compact arrangement interiorly of the undercarriage of the vehicle.

Figure 3:
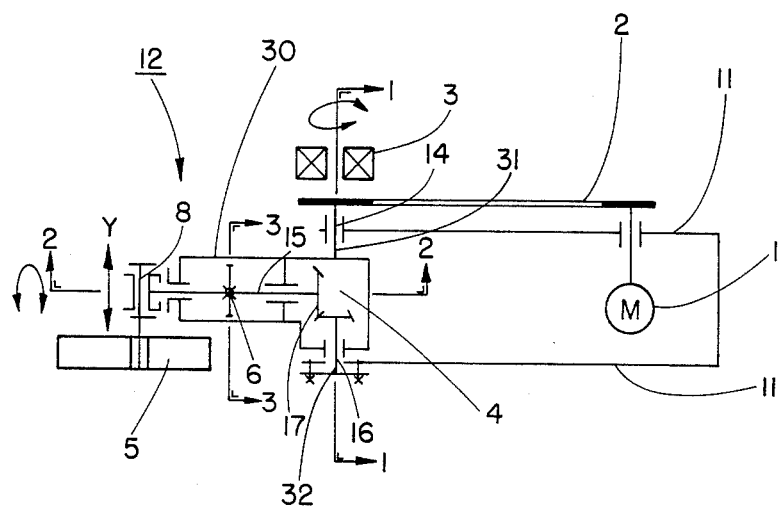
FIG. 3 shows an operating diagram of the roller guide device of FIGS. 1 and 2.

The operating system of the roller guide device of FIGS. 1 and 2 is illustrated in FIG. 3. The U-shaped retaining lever 11 houses a geared DC motor 1 which rotates the pivoting shaft 14 about the axis of rotation I—I through the intermediary of a chain drive 2.

The pivoting shaft 14, and the pivoting lever 12 extending at right angles thereto, engage each other through a bevel gear unit 4. The bevel gear unit 4 consists of a bevel gear 16 located in alignment with the axis of rotation I—I of the pivoting shaft 14, with the bevel gear being fixedly attached to the retaining lever 11. The bevel gear 16 meshes with another bevel gear 17 arranged perpendicularly thereto and is fixedly connected along the longitudinal shaft 15 of the pivoting lever 12 which is pivotally supported in the housing 30 of the bevel gear unit 4. The bevel gear unit housing 30 is rigidly connected with the pivoting shaft 14.

With reference now to FIG. 3, the left-hand end of the rotatable pivoting lever 12 comprises a roller bearing (not shown), rendering the contact roller 5 freely rotatable. The contact roller 5 is vertically adjustable in the y-direction along its axis of rotation by means of a hollow clamping screw 8 for adaptation to the height of an associated guide track 10, such as a guide rail.

Further capability for laterally adjusting the roller guide device is provided by the rail-like flanged portion 7 in the attachment region of the steering linkage 13. The maximum projection of the contact roller 5 in its extended operative condition can readily be adjusted in the area x along the flanged portion 7. This naturally requires that the connecting bolts first be removed. Infinitely variable adjustment of the roller track in the area x can conceivably be achieved when, for example, the flanged portion 7 is provided with a dovetail cross-section (not shown) and when setscrews (not shown) are employed.

The contact roller 5 can be arrested in its extended operative condition by means of a rotational stop 6 on the pivoting lever or on the longitudinal shaft 15, which is adapted -abut against a stationary setscrew 33 threaded into the housing 30 of the bevel gear unit 4. As is shown in FIG. 3, the pivoting lever 12 includes a bevel gear unit housing 30 which is attached to the upper part 31 of the pivoting shaft 14. The lower part 32 is aligned with the pivoting shaft and includes fixedly mounted bevel gear 16 wherein the lower part 32 and the bevel gear 16 are fixedly mounted to the retaining lever 11. Therefore, the upper part 31 of the pivoting shaft 14 can be driven by the transmission 2 of the motor 1 only to pivot the housing 30 whereas the inner longitudinal shaft 15 is rotated by the fixedly mounted bevel gear 17 which meshes with the stationary but pivoted bevel gear 16. It follows that the rotated shaft 15 turns the roller 5 by an angle of 90° to take the position of retracted roller 5 as shown in FIG. 2. The rotational stop 6, which forms a key-and-slot connection with the pivoting lever 12, is shown in greater detail in FIG. 4.

Figure 4:
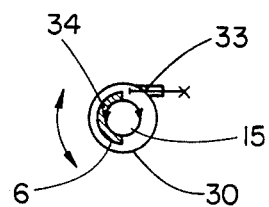
FIG. 4 is a fragmentary view of the pivoting lever shown along line III—III in FIG. 3.

The setscrew 33, as shown in FIG. 4, is screwed into the housing 30 to provide a rest or a stop for a stopping protrusion 34 of the longitudinal shaft 15 to arrest the shaft 15 at least in one end position of the turned shaft 15, in special cases by a second setscrew (not shown) which is able to engage the protrusion segment for example on the other radially extended front side. The roller 5 can rotate freely both in the retracted and in the operating position according to its free axis 8 of FIG. 3.

Arranged at the outer rotating end of the pivoting shaft 14, in the area of chain drive 2, is a torque lock 3 for eliminating the transmission of any forces from the guide track 10 and resulting from the contact roller 5 when engaged, to the geared DC motor 1. This nevertheless still permits, when the geared DC motor 1 is being operated, the pivoting lever 12 to be pivoted and simultaneously rotated through 90°. As is apparent from the schematic arrangement of the operating system shown in FIG. 3, when viewed in conjunction with FIGS. 1 and 2, the retraction and the operative extrusion of the contact roller 5 by 180° is achieved by rotation through 180° about the axis I—I (primary drive). Rotation of the contact roller 5 is achieved by rotation through 90° about the axis II—II (secondary drive). Primary and secondary drives interact such that stowing and deployment, with the contact roller simultaneously rotating, follows a pattern wherein, when pivoting through 180° about the axis I—I is completed, there is also completed rotation through 90° about the axis II—II. The torque lock 3 serves to latch the contact roller 5 in both its retracted and its operatively extended conditions after rotation about axis I—I so as to prevent any further relative movement between the roller and the retaining lever. In this manner the torque lock 3 relieves the primary drive of the operating forces, but allows it to be unlatched from the input end whenever necessary in order to effect the retracting or extending movements.

What is claimed is:

1. Roller guide for use on a vehicle; comprising a contact roller biased into contact with and rolling along a stationary guide track; including a roller retaining mechanism consisting of a retaining lever connected to the steering linkage of the vehicle and of a pivotable lever which is rotatable about its longitudinal centerline and is pivotally connected to a foward end of the retaining lever; the contact roller being freely rotatably supported on the free end of said pivotable lever and the pivotable lever adapted to be pivoted from a retracted position in which it essentialy coincides with the axis of the retaining lever into an essentially straight-line operatively extended position; said pivotable lever including a pivotable shaft; a primary drive including a geared DC motor mounted on said retaining lever including a chain drive for actuating said pivotable shaft; a torque lock on said pivotable shaft for latching the pivotable lever in the retracted or the extreme extended positions and for unlatching the pivotable lever upon actuation of the primary drive.

2. Roller guide device as claimed in claim 1, wherein the pivotable lever is rotatable through an angle of about 90° about its longitudinal centerline.

3. Roller guide device as claimed in claim 2, wherein a secondary drive is integrated into the pivotable lever, said secondary drive including a bevel gear unit, said secondary drive facilitating rotation of the pivotable lever about its longitudinal centerline while effecting pivoting motion thereof.

4. Roller guide device as claimed in claim 3, wherein the bevel gear unit includes a bevel gear aligned with the pivotable shaft, said gear being connected with the retaining lever and meshing with a further bevel gear which is aligned with the longitudinal centerline of the pivotable lever and is attached to said pivotable lever.

5. Roller guide device as claimed in claim 3, wherein a rotational stop is located on the longitudinal axis of the pivotable lever, and said torque lock comprises a lock latching the pivotable lever upon completion of its rotary unit motion.

6. Roller guide device as claimed in claim 1, wherein the retaining lever is laterally adjustably connected to the vehicle steering linkage.

7. Roller guide device as claimed in claim 1, wherein the contact roller is adjustable along its axis of rotation.

8. Roller guide device as claimed in claim 7, wherein the contact roller is axially adjustable through the intermediary of a hollow clamping screw.

* * * * *